Figures 1, 2:
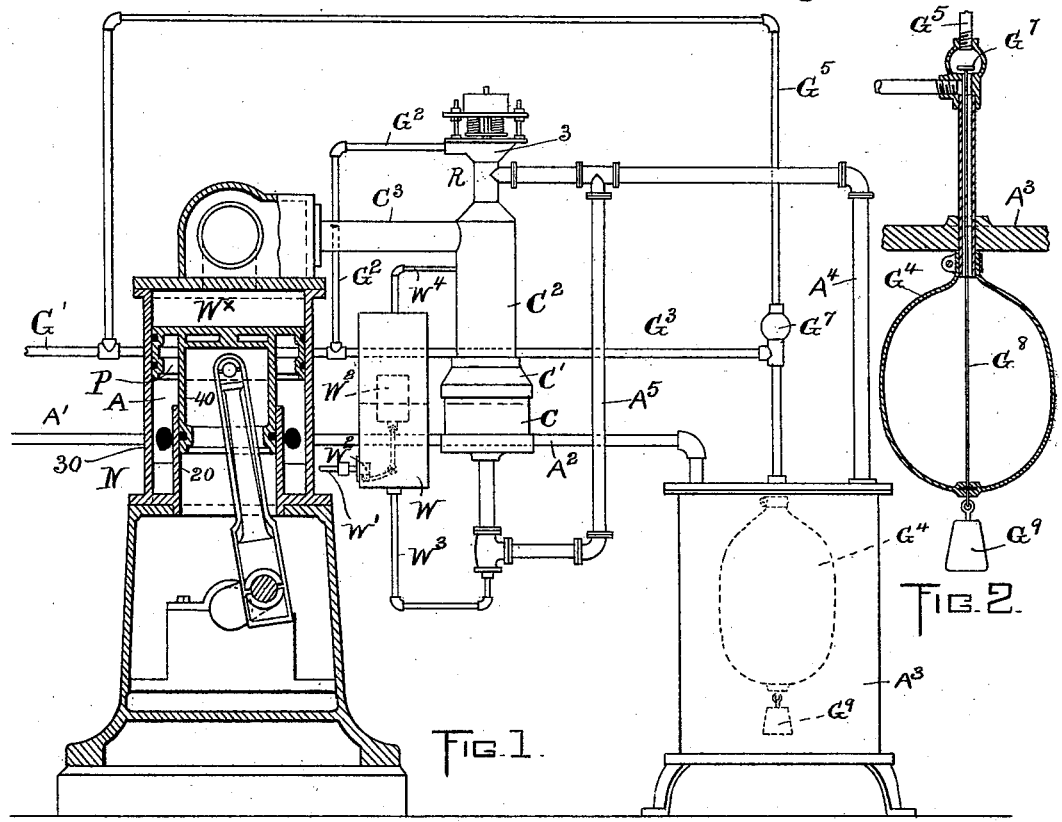

(No Model.) 2 Sheets—Sheet 1.

S. A. REEVE.
HEAT ENGINE.

No. 588,293. Patented Aug. 17, 1897.

WITNESSES:
A. D. Harrison
P. W. Pezzetti

INVENTOR:
Sidney A. Reeve
by Wright Brown & Quimby
attys.

(No Model.) 2 Sheets—Sheet 2.
S. A. REEVE.
HEAT ENGINE.
No. 588,293. Patented Aug. 17, 1897.
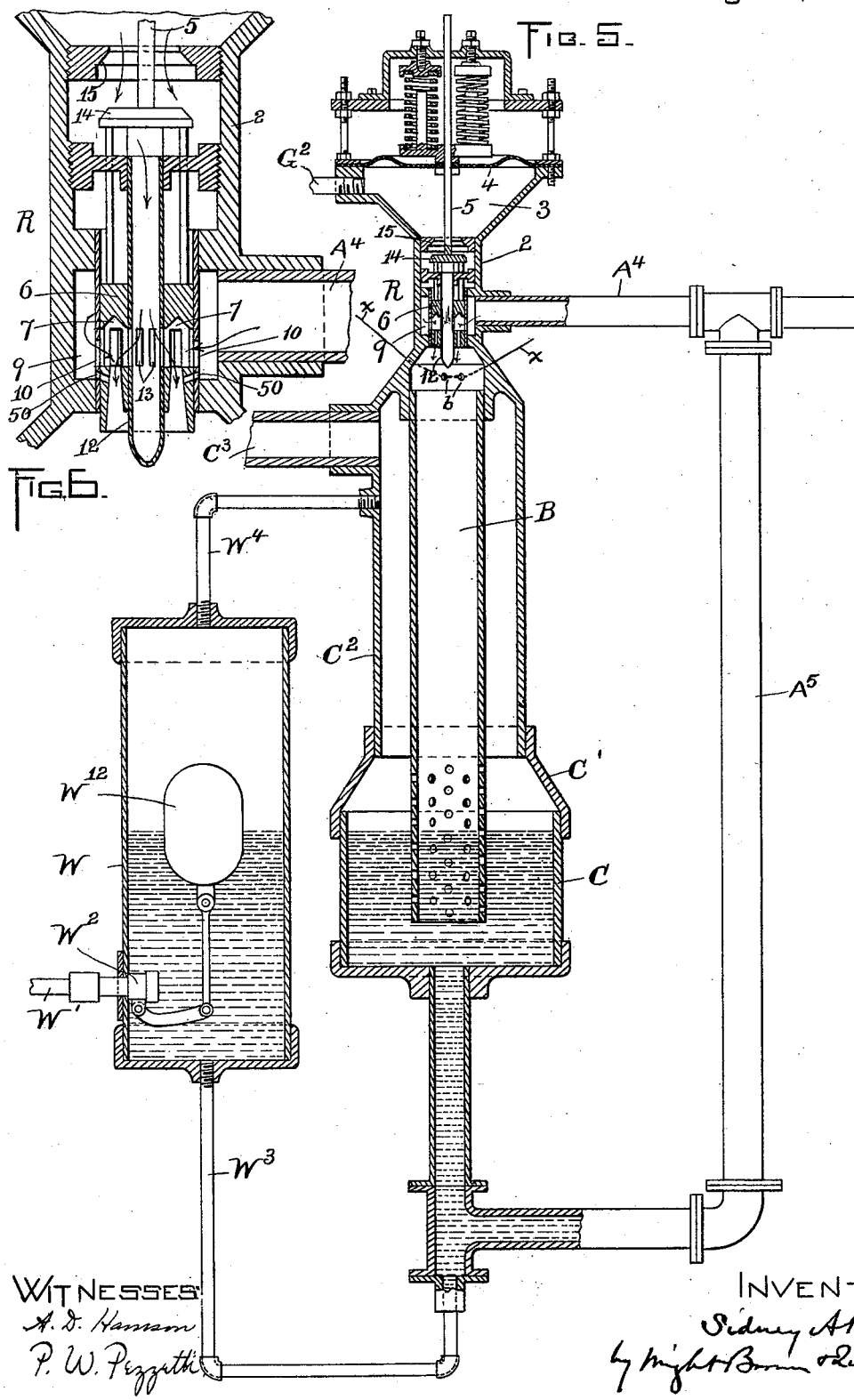
WITNESSES
A. D. Hanson
P. W. Pizzetti
INVENTOR:
Sidney A. Reeve
by Wright Brown & Quinby
attys.

UNITED STATES PATENT OFFICE.

SIDNEY A. REEVE, OF WORCESTER, MASSACHUSETTS, ASSIGNOR TO CHARLES F. BROWN, TRUSTEE, OF READING, MASSACHUSETTS.

HEAT-ENGINE.

SPECIFICATION forming part of Letters Patent No. 588,293, dated August 17, 1897.

Application filed February 1, 1897. Serial No. 621,389. (No model.)

*To all whom it may concern:*

Be it known that I, SIDNEY A. REEVE, of Worcester, in the county of Worcester and State of Massachusetts, have invented certain new and useful Improvements in Heat-Engines, of which the following is a specification.

The invention relates to engines in which a mixture of air and fuel is continuously burned in a combustion-chamber connected with the working cylinders of an engine.

The invention relates particularly to engines organized to operate as described in my application for Letters Patent of the United States filed December 15, 1894, Serial No. 531,915. Said application shows and describes an apparatus comprising an engine, a fuel pump or compressor, and an air-compressor operated by the engine, a fuel-reservoir and an air-reservoir connected, respectively, with said fuel and air compressors, a combustion-chamber which receives fuel and air from said reservoirs and in which combustion of a mixture of the fuel and air is continuously maintained, a conduit for the products of combustion leading from the combustion-chamber, a supplemental outlet connecting the air-chamber with said outlet and provided with a yielding valve adapted to release into said conduit any excess of air-pressure over the pressure of the products of combustion in said conduit, a supplemental outlet connecting the fuel-reservoir with the source of fuel-supply, and a cooling-chamber having its interior connected with the combustion-chamber and with the engine and containing a body of water through which the heated products of combustion are passed, the heated gases being cooled down by their passage through the water to the temperature of saturation and thus reduced to a stable or uniform temperature before entering the working cylinders of the engine.

My present improvements are embodied in an apparatus which includes generally the elements above enumerated, said improvements including, first, means for automatically maintaining the pressure of the air and fuel (whether the latter be gaseous or liquid) at a predetermined relation, so that the air and fuel may be automatically delivered in uniform proportions to the engine; secondly, means for determining by the fuel-pressure the proportions of air and fuel admitted to the combustion-chamber; thirdly, a novel construction of the cooling-chamber and the arrangement of the combustion-chamber in such relation to the conduit for the products of combustion from the cooling-chamber to the engine as that the temperature of the said products shall be raised by surface conduction to the point of superheat desired to give a suitable working temperature, and, fourthly, a liquid seal for releasing into the conduit for the products of combustion any existing excess of air-pressure over the pressure of said products, said liquid seal being substituted for the yielding valve shown in said application.

My invention also includes certain incidental improvements, all of which I will now proceed to describe and claim.

Figure 3:
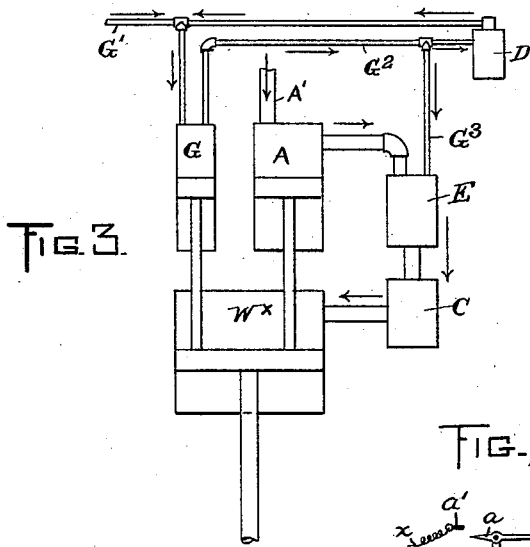
Figure 4:
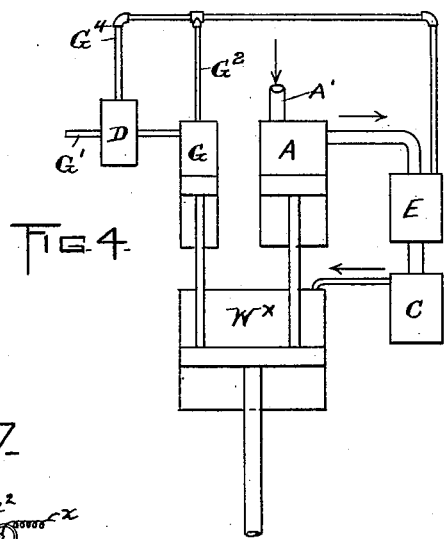
Figure 7:
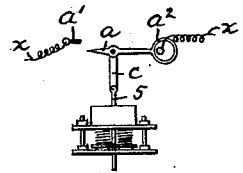

Of the accompanying drawings, forming a part of this specification, Figure 1 represents a side elevation, partly sectional, of an apparatus embodying my invention. Fig. 2 represents a sectional view of the fuel-reservoir and its relief-valve shown in Fig. 1. Figs. 3 and 4 represent diagrammatic views illustrating my improvements relating to the regulation of continuous-combustion engines. Fig. 5 represents a sectional view, on a larger scale, of the combustion and cooling chambers and the valve which regulates the admission of air and fuel thereto. Fig. 6 represents an enlargement of a portion of Fig. 5. Fig. 7 represents an elevation of a detail of the igniter mechanism, hereinafter described.

The same letters and numerals of reference indicate the same parts in all the figures.

In the drawings, N represents an engine having working cylinders, one of which is shown at $W^\times$, an air-compression cylinder A, and a gas-compression cylinder G. The term "gas" is used for convenience to designate the fuel employed, but it will be understood that either gaseous or liquid fuel may be used, and that when the fuel is a liquid, as oil, the part G will be a suitable pump. Air enters the cylinder A through an inlet A' and is discharged therefrom through a conduit $A^2$ to an air-reservoir $A^3$, in which it is stored under pressure and from which it passes to the combustion-chamber B through a conduit $A^4$ and a regulator-valve R, communicating with said conduit and combustion-chamber.

The preferred construction of the regulator-valve R is shown in Figs. 5 and 6. The casing 2 of said valve is enlarged at its upper end to form a chamber 3, which receives the gas-conduit $G^2$. A diaphragm 4, forming a flexible top or cover for said chamber, is attached by a stem 5 to an annular plunger 6, which has a sliding fit in the interior of the casing 2 and is provided with a series of ports 7, extending from its outer to its inner surface, said ports communicating with outlet-passages extending through the lower end of the plunger. An annular air-passage 9, formed in the casing 2 and communicating with the air-conduit $A^4$, communicates through fixed air-ports 10 with the outer ends of the ports 7 when permitted by the position of the plunger 6.

12 is a fixed gas-tube located within the plunger 6 and communicating at its upper end with the gas-chamber 3, its lower end being closed. In the tube 12 are gas-ports 13, located opposite the air-ports 10, the plunger 6 being interposed between said gas and air ports. A valve 14 is affixed to the plunger 7 above the latter and above the gas-tube 12 and is adapted to close upwardly against a fixed seat 15. The plunger 6 and valve 14 are governed by the gas-pressure in the chamber 3. When said pressure is not sufficient to affect the diaphragm, the plunger and valve descend, the plunger uncovering the air and gas ports 10 and 13 and causing the ports 7 to coincide therewith, so that the air and gas can pass freely through said ports to the combustion-chamber, as indicated by arrows in Fig. 6. As the gas-pressure increases and the diaphragm rises the ports 7 10 13 are first partially closed, restricting the flow of gas and air, and if the upward movement of the diaphragm be sufficiently continued said ports are entirely closed and the valve 14 is seated, thus entirely stopping the flow of gas and the bulk of that of the air. It will be seen that this construction of regulator-valve provides for an absolute cessation of the gas-supply whenever the conditions are such as to require it, the valve 14 and its seat 15 insuring this result.

I do not limit myself to a regulator-valve having a diaphragm, as the valve may be provided with other means for utilizing the actuating pressure. The essential features of my regulator-valve are, first, suitable means for simultaneously regulating the quantities of air and gas delivered to the combustion-chamber, and, secondly, simple provisions for shutting off the gas so entirely as to prevent any leakage of the same into the combustion-chamber. A relatively slight leakage of air is not objectionable. Hence I have not complicated the construction of the valve by providing for an absolute cessation of the flow of air. The plunger 6 and the valve 14 connected therewith may be termed a "regulating" device, comprising two connected valve members.

To provide for the maintenance of combustion after a period of zero, negative, or even very light load upon the engine, the apparatus must be equipped with an igniter. This may be one of several forms, such as—

First, an ordinary electrical igniter such as is used in gas-engines, located at the upper end of the combustion-chamber. Such an igniter is indicated in Fig. 5, in which two terminals $b$, slightly separated from each other, are shown. These in practice are insulated from each other and from the walls of the combustion-chamber and are connected with circuit-wires $x$. In order to avoid waste of battery by providing sparks during continuous combustion when not needed, the circuit may be carried through two breakers. One is closed by the engine every revolution, (or every two or three, &c.,) periodically. The other is closed by the plunger 6 when at or near the lower limit of its movement. Thus sparks will be supplied periodically during any period when there might be danger of the flame in the combustion-chamber being extinguished.

In Fig. 7 I illustrate means for controlling the period and frequency of the sparks according to the position of the regulator-valve. In said figure, 5 is the stem of the plunger 6. (Shown in Fig. 5.) To the upper end of this stem is pivoted a link $c$, the upper end of said link pivotally supporting a pawl $a$, which is constantly reciprocated by an eccentric $a^2$, that is rotated by suitable connections with the engine-shaft. A contact-point $a'$ is mounted in fixed position, said point $a'$ and pawl $a$ being connected with the circuit-wires $x$ and insulated from their supports.

When the regulator-valve is wide open, the situation is as shown in Fig. 7, and pawl $a$ moves back and forth without completing the circuit. Should the valve so nearly close as to render combustion uncertain or be just opened after a period of complete closure, the pawl $a$ will be brought into line with point $a'$ and cause a spark at $b$ in the combustion-chamber. The igniter will then be operated at every rotation of the eccentric $a^2$. Should the valve close entirely, the pawl $a$ will pass above the point $a'$, and should it open wide, making combustion too certain to need ignition, the pawl will miss the point $a'$ below, as indicated in Fig. 7. In either case there is no waste of current by unnecessary sparks.

Second. An ordinary hot tube can be set across the path of the entering mixture of gas and air and always kept hot by a permanent gas-flame traversing its interior or exterior. If the valve R be closed or partially closed, the air passes through a by-pass $A^5$, which communicates with the bottom of the cooling-chamber C, said chamber and the lower portion of the by-pass containing a body of water which acts as a seal, preventing the passage of air from the by-pass to the cooling-chamber until the air-pressure is sufficient to displace the seal and force its way through it into the cooling-chamber, said seal being a substitute for the spring-controlled check or valve shown in my former application and constituting a part of my present invention. The resistance of this water seal to the air-pressure can be much more simply and accurately controlled than a metallic mechanical device like the said check-valve.

Gas enters the cylinder G from a source of gas-supply through a conduit $G'$ and passes from said cylinder through a conduit $G^2$ to the regulator-valve R. If said valve be closed, the gas passes through a branch conduit $G^3$ to a flexible or compressible gas-reservoir $G^4$, located within the air-reservoir $A^3$, said gas-reservoir constituting a part of my present invention. Any excess of gas-pressure above a predetermined limit is automatically released from the gas-reservoir $G^4$ and passes through a conduit $G^5$ back to the supply-conduit $G'$.

$G^7$ represents a valve adapted to shut off the by-pass $G^5$ from the conduit $G^3$, said valve being attached to the lower or inner portion of the fuel-reservoir $G^4$ either securely or in such manner as to permit a certain amount of lost motion.

Gas is forced by the compressor G into the conduit $G^3$ and the flexible gas-reservoir $G^4$, and compressed air is at the same time forced into the air-reservoir $A^3$. The gas-reservoir is of such construction that the portion to which the valve-rod $G^8$ is attached is movable toward and from the seat of the valve $G^7$. To this end the said reservoir may be a bag of any suitable flexible but preferably inelastic material impervious to gaseous or liquid fuel under pressure, a suitable material being a combination of layers of rubber and cloth. A bag thus constructed is adapted to be collapsed by the pressure of the surrounding air upon it. The lower portion of the gas-reservoir to which the valve-rod is attached is normally depressed or forced away from the said valve-seat to hold the valve closed. This may be accomplished by gravitation due to the weight of the movable portions of the reservoir and of the valve and valve-rod aided, if necessary, by a weight $G^9$ or by a spring which may be substituted for said weight to exert a downward pull on the reservoir and valve-rod.

Gas passes from the reservoir $G^4$ and air from the reservoir $A^3$ to the combustion-chamber, since pressure in said reservoirs is practically equal in relative quantities determined by the construction of the regulator-valve R, the fuel-reservoir being collapsed or contracted by an excess of air-pressure in the reservoir $A^3$ over the fuel-pressure.

When the supply of gas causes an excess of gas-pressure in the gas-reservoir over the air-pressure in the air-reservoir, the gas-reservoir will be expanded, increasing the air-pressure and thus tending to equalize the pressures and at the same time opening the valve $G^7$ and releasing the excess of gas through the by-pass $G^5$ to the supply-pipe $G'$. When the gas-pressure is sufficiently reduced, the gas-reservoir is contracted, and the valve $G^7$ closed until the gas-pressure again becomes excessive.

It will be seen that by inclosing the expansible gas-reservoir in an air-reservoir I utilize the pressure of both the gas and air to equalize the supply of each element to the engine and am enabled to employ a relatively cheap and at the same time safe fuel-reservoir of considerable size. An important feature of this part of my invention is the utilization of the increasing fuel-pressure to partially compress the air in the air-reservoir, thus tending to equalize the pressures and at the same time permitting considerable variation in volume without material difference in pressure between the fuel and air. Conversely, a decreasing fuel-pressure leads to partial expansion of the air in the air-reservoir, and thus to a similar tendency toward equalization.

The utilization of the expansion of the fuel-reservoir to actuate a fuel relief-valve is another desirable feature, although the fuel-pressure is reduced to a certain extent by the expansion of the fuel-reservoir, and hence the relief-valve may not be considered essential in all cases.

The combustion-chamber B receives a mixture of gas and air from the regulator-valve R and is provided with suitable means, as hereinafter indicated, for igniting said mixture, the combustion of which is continuously maintained. The chamber B is a vertical tube communicating at its upper end with the regulator-valve and at its lower end with the cooling-chamber C, into which it projects at its lower end, discharging the products of combustion into the body of water in said chamber. The combustion-chamber proper is of course located above the water and may be lined with refractory material, such as fire-brick. The lower portion of the tube forming said chamber is submerged in the water and preferably provided with numerous perforations, through which portions of said products enter the water. The cooling-chamber C surrounds the said extension or outlet of the combustion-chamber and is provided with means for maintaining the water-level in said cooling-chamber, (thus maintaining the water seal in said by-pass $A^5$.) Said means, as herein shown, comprise a water-reservoir W, located beside the cooling-chamber and having an inlet $W'$, connected with a source of water-supply, a valve $W^2$, controlling said inlet and opened and closed by a float $W^{12}$ in the reservoir, the float closing the valve when the water rises to a predetermined level in the reservoir W and opening the valve when the water falls below said level, and an outlet W³, communicating with the by-pass A⁵ and with the bottom of the cooling-chamber. A pipe W⁴ connects the reservoir W with the cooling-chamber above the water-level to make the water-line uniform in the reservoir and chamber. The by-pass A⁵ extends a considerable distance below the cooling-chamber C, so that there is normally a column of water of considerable height in the by-pass. The cross-sectional area of the by-pass is considerably less than that of the cooling-chamber and the chamber W. This difference in cross-section and the height of the water column in the by-pass are factors of some importance in controlling the head or pressure which forces the air and gas through the regulator-valve R.

It may be here noted that as the loads become lighter and the flow of the gases through the combustion and cooling chambers becomes less the water will be crowded up into the cooling-chamber by the increased air-pressure covering a greater extent of the perforated portion of the combustion-chamber extension and thus bringing the hot gases and water into more intimate contact.

The upper portion of the cooling-chamber is contracted by an inwardly-projecting shoulder C' to force the products of combustion rising from said chamber inwardly against the heated external surface of the combustion-chamber for a purpose hereinafter described. The contracted portion of the cooling-chamber is connected with a tubular extension C², surrounding the combustion-chamber B and extending to the upper end thereof, where it is connected by a conduit C³ with the working cylinders of the engine.

By passing the heated gases from the combustion-chamber through and in direct contact with the water in the cooling-chamber I cool the gases down from the temperature of combustion (about 2,400° Fahrenheit) to the temperature of saturation of water under the proposed pressure, (about 400° Fahrenheit,) thus avoiding the necessity of cooling the gases by injecting into them a diluent, such as water or air. The temperature of saturation is, however, somewhat lower than is desired for the working pressure, about 600° or higher being the desideratum. By locating the combustion-chamber in close proximity to the cooling-chamber and forming the upper portion of the latter so that the cooled gases will pass along the external surface of the combustion-chamber on their way to the engine I raise the temperature of the gases to the desired point by surface conduction, a process which is entirely suitable for the adjustment of the temperature from the approximate goal of 400°, to which it was reduced by contact with the water, to the exact working temperature found desirable. By thus first abruptly reducing the temperature and then raising it by surface conduction I am enabled to insure stability of working temperature of the gases; also, I jacket my combustion-chamber and utilize by re-absorption what else would be waste heat. The question of stability of temperature under any and all conditions of service is one of great importance in engines of this character. The contracting shoulder C' in the cooling-chamber gives a larger surface for separation of water thrown up by violent ebullition against the water-surface of the tube B and so leads to their evaporation and brings the surfaces of the tube B and extension C² closely together, so that the steam arising from the water in the cooling-chamber is superheated.

I do not limit myself to the location of the combustion-chamber within the conduit C², extending from the cooling-chamber, as the combustion-chamber may be entirely outside the cooling-chamber, in which case a conduit extending from the combustion-chamber would extend into the cooling-chamber and the conduit C² and would present a heating-surface to the steam and gases rising from said conduit. It will be understood, therefore, that the term "combustion-chamber" is intended to cover also a conduit extending from a combustion-chamber into the cooling-chamber.

A principle of operation aimed at by me is the stable equilibrium of all fluid phenomena occurring in the apparatus with as little control as possible by mechanical devices involving frictional contact of one part with another.

The water seal of the air by-pass A⁵, the expansible gas-reservoir located in the air-reservoir, and the shut-off valve 14, connected with the air and gas regulating plunger 6 and permitting a comparatively loose fit of said plunger between the air-ports 10 and gas-ports 13, illustrate this principle.

I have described in this and in my above-mentioned former application a general scheme of regulating and controlling the pressure of the entire system under which a continuous combustion operates, as also details of devices for carrying out such a scheme. There are, however, other methods of attaining such regulation and other general plans of maintaining such control, which are included in the scope of my invention and which are illustrated by diagram in Figs. 3 and 4.

Let W$^\times$, Fig. 3, be the expansion or working cylinder of such an engine, and A and G the air and fuel pumps, respectively. A draws air from the atmosphere and discharges it into the combustion-chamber E in a fixed quantity, whence the products of combustion pass through a cooling-chamber C to the working cylinder W$^\times$. This process may take place in connection with a reservoir of compressed air or said reservoir may be omitted. G draws gas or oil from a main supply and discharges through G² and G³ either into E or D. D is a regulator-valve or escape-valve of any ordinary construction and operated and controlled by the pressure in the line $G^2$, which permits fuel to escape when the pressure reaches the desired point back into G. The action of D will evidently be, first, to reduce the pressure in $G^2$, as compared with that in E, and so reduce or limit the amount of fuel entering E, and, secondly, to thereby limit the increase of volume resultant from combustion and thus the pressure in the system beyond $G^3$. The action of the rest of the system, without any regard to the action of D, will be to make the pressure in E follow that in $G^2$, for an excess of air coming from A will check the flow of fuel into E, while a deficiency will operate oppositely, thus forcing a deviation in either way to bring into operation a check upon itself, and so resulting in a fluid system which is in automatic stable equilibrium.

In the arrangement shown in Fig. 4 the pressure in $G^2$ is controlled by a regulator-valve, such as that shown at R in Fig. 5, by the control of said valve over the pressure of the gas approaching the pump. Otherwise the effect of the pressure in $G^2$ upon the phenomena in the remainder of the system is that described above.

The air-compression cylinder A, as here shown, is annular and surrounds a reduced portion 20 of the working cylinder $W^\times$, the piston P in said working cylinder fitting the enlarged portion 30 of said cylinder and having an extension 40 fitting the reduced portion 20. The piston P is therefore enabled to coöperate both with the working cylinder and with the air-compression cylinder. This arrangement gives great efficiency in the transmission of power, there being no change in the direction of transmitted force or motion during its transmission. The same result may be produced by providing an independent air-cylinder located in line with the working cylinder and having a piston connected directly with the piston of the working cylinder, so that the two will work in unison.

I prefer to admit air through the variable ports 10 of the regulator-valve in sufficient quantity only to form with the gas a mixture which is inflammable in air, but is non-explosive until the supply of air is increased. The mixture receives an additional supply of air after it has entered the combustion-chamber, this supply being furnished either by leakage of air through the valve or by small air-passages 50, communicating with the air-conduit $A^4$. These air-passages, like the ports 10, may be variable by movements of the plunger. By this arrangement I provide for the thorough mixture of the gas and air before.

I claim—

1. The combination of a combustion-chamber, a conduit leading therefrom for the products of combustion, an air-reservoir and a fuel-reservoir connected with the combustion-chamber through a suitable pressure-regulator, a by-pass connecting the air-reservoir with the said conduit, and a liquid seal between said by-pass and conduit.

2. The combination of a combustion-chamber, a cooling-chamber communicating therewith, a conduit for the products of combustion leading from the cooling-chamber, an air-reservoir and a fuel-reservoir connected with the combustion-chamber through a suitable pressure-regulator, a by-pass connecting the air-reservoir with the cooling-chamber, and a body of water contained in said cooling-chamber and arranged to receive the gases from the combustion-chamber and serve as a water seal for the by-pass.

3. The combination of a combustion-chamber, a cooling-chamber having a body of water arranged to receive gases from the combustion-chamber to reduce the temperature of said gases to a stable point, and a conduit from the cooling-chamber arranged to surround the combustion-chamber and cause the superheating of the steam and gases from the cooling-chamber by surface conduction.

4. The combination of a combustion-chamber, a cooling-chamber arranged to receive the combustion-chamber or an extension thereof, said chamber having a body of water into which the gases are discharged from the combustion-chamber, the said cooling-chamber being contracted above the water-space, and a conduit connected with the contracted portion of the cooling-chamber and arranged to conduct steam and gases from the cooling-chamber along the heated external surface of the combustion-chamber.

5. The combination of a combustion-chamber, separate conduits for supplying said chamber with air and gas, means for separately forcing air and gas under pressure through said conduits to the combustion-chamber, a regulating device comprising two connected valve members, one controlling the air-conduit and the other controlling the gas-conduit, and pressure-controlled means acting on said device for simultaneously varying the flow of air and gas, one of said valve members having provisions for entirely shutting off the flow of gas.

6. The combination of a combustion-chamber, means for forcing air and gas under pressure to said chamber, said means including a series of gas-ports and a series of air-ports, a plunger movable between the two series of ports and formed to simultaneously regulate the flow of gas and air through said ports, a valve connected with said plunger and adapted to shut off the flow of gas, and pressure-controlled means for operating said plunger and valve.

7. The combination of a combustion-chamber, means for admitting air and gas to said chamber under pressure, said means including an annular series of air-ports, and an annular series of gas-ports, the two series being separated by an annular space, an annular plunger movable in said space and provided with a series of outlet-ports arranged to coincide simultaneously with the gas and air ports and to cover and uncover the same, a gas shut-off valve connected with said plunger, and a pressure-actuated diaphragm connected with said valve and plunger.

8. An apparatus of the character specified, comprising means for supplying air and fuel under pressure, a pressure-equalizing apparatus comprising an air-reservoir and a flexible expansible fuel-reservoir arranged to be acted on by the contents of the air-reservoir, and a combustion-chamber connected with said air and fuel reservoirs.

9. In an apparatus of the character specified, a pressure-equalizing apparatus comprising an air-reservoir, an expansible fuel-reservoir contained in the air-reservoir, means for forcing fuel into the expansible reservoir under pressure, and a relief-valve for the fuel-reservoir operated by movements of the latter.

10. In an apparatus of the character specified, a pressure-equalizing apparatus comprising an air-reservoir, an expansible fuel-reservoir contained in the air-reservoir, means for forcing fuel into the expansible reservoir under pressure, a relief-valve for the fuel-reservoir operated by movements of the latter, and a return-pipe between the relief-valve and the source of fuel-supply.

11. The combination of a continuously-operative isolated combustion-chamber, means for forcing gas and air under pressure to the combustion-chamber, and a valve controlled by the air-pressure for releasing a portion of the compressed gas back to the original supply.

12. The combination of a continuously-operative isolated combustion-chamber, means for forcing gas and air under pressure to the combustion-chamber, and a regulator-valve controlled by the air-pressure adapted to release a portion of the compressed gas back to the original supply.

13. The combination of a combustion-chamber, apparatus for forcing gas and air under pressure to the combustion-chamber, and a regulator-valve having pressure-controlled means for reducing the pressure of the gas-supply approaching said apparatus.

14. The combination of a combustion-chamber, means for forcing air and gas under pressure to said chamber, and a regulating-valve having pressure-controlled means for simultaneously varying the flow of air and gas, and for dividing the air-supply, a partial supply being mixed with the gas within the valve, and an additional supply within the combustion-chamber.

In testimony whereof I have signed my name to this specification, in the presence of two subscribing witnesses, this 18th day of January, A. D. 1897.

SIDNEY A. REEVE.

Witnesses:
C. F. BROWN,
M. B. MAY.